(12) United States Patent
Hughes et al.

(10) Patent No.: US 8,095,774 B1
(45) Date of Patent: Jan. 10, 2012

(54) PRE-FETCHING DATA INTO A MEMORY

(75) Inventors: David Anthony Hughes, Los Altos Hills, CA (US); John Burns, Los Altos, CA (US)

(73) Assignee: Silver Peak Systems, Inc., Santa Clara, CA (US)

( * ) Notice: Subject to any disclaimer, the term of this patent is extended or adjusted under 35 U.S.C. 154(b) by 728 days.

(21) Appl. No.: 11/825,497

(22) Filed: Jul. 5, 2007

(51) Int. Cl.
*G06F 12/00* (2006.01)
(52) U.S. Cl. ......... 711/213; 711/104; 711/137; 711/216
(58) Field of Classification Search .................. 711/137, 711/162, 213, 216, 104
See application file for complete search history.

(56) References Cited

U.S. PATENT DOCUMENTS

| | | | |
|---|---|---|---|
| 5,307,413 A | 4/1994 | Denzer | |
| 5,359,720 A | 10/1994 | Tamura et al. | |
| 5,483,556 A | 1/1996 | Pillan et al. | |
| 5,592,613 A * | 1/1997 | Miyazawa et al. | 714/6.1 |
| 5,611,049 A | 3/1997 | Pitts | |
| 5,675,587 A | 10/1997 | Okuyama et al. | |
| 5,754,774 A | 5/1998 | Bittinger et al. | |
| 5,802,106 A | 9/1998 | Packer | |
| 5,883,891 A | 3/1999 | Williams et al. | |
| 6,000,053 A | 12/1999 | Levine et al. | |
| 6,003,087 A | 12/1999 | Housel et al. | |
| 6,081,883 A | 6/2000 | Popelka et al. | |
| 6,295,541 B1 | 9/2001 | Bodnar et al. | |
| 6,374,266 B1 | 4/2002 | Shnelvar | |
| 6,434,662 B1 * | 8/2002 | Greene et al. | 711/108 |
| 6,438,664 B1 * | 8/2002 | McGrath et al. | 711/154 |
| 6,452,915 B1 | 9/2002 | Jorgensen | |
| 6,587,985 B1 | 7/2003 | Fukushima et al. | |
| 6,618,397 B1 | 9/2003 | Huang | |
| 6,633,953 B2 * | 10/2003 | Stark | 711/108 |
| 6,643,259 B1 | 11/2003 | Borella et al. | |
| 6,650,644 B1 | 11/2003 | Colley et al. | |
| 6,718,361 B1 | 4/2004 | Basani et al. | |
| 6,738,379 B1 | 5/2004 | Balazinski et al. | |
| 6,769,048 B2 | 7/2004 | Goldberg et al. | |
| 6,791,945 B1 | 9/2004 | Levenson et al. | |
| 6,859,842 B1 | 2/2005 | Nakamichi et al. | |

(Continued)

FOREIGN PATENT DOCUMENTS

EP 1507353 A2 2/2005

OTHER PUBLICATIONS

Zhao et al.; "Analysis and Improvement on IPSEC Anti-Replay Window Protocol"; 2003; IEEE' pp. 553-558.
Singh et al. ;" Future of Internet Security-IPSEC"; 2005; pp. 1-8.
"Muthitacharoen, Athicha et al., "A Low-bandwidth Network File System," 2001, in Proc. of the 18th ACM Symposium on Operating Systems Principles, Banff, Canada, pp. 174-187".
Shared LAN Cache Datasheet, 1996, http://www.lancache.com/slcdata.htm.

(Continued)

*Primary Examiner* — Mardochee Chery
(74) *Attorney, Agent, or Firm* — Carr & Ferrell LLP

(57) ABSTRACT

Systems and methods for pre-fetching of data in a memory are provided. By pre-fetching stored data from a slower memory into a faster memory, the amount of time required for data retrieval and/or processing may be reduced. First, data is received and pre-scanned to generate a sample fingerprint. Fingerprints stored in a faster memory that are similar to the sample fingerprint are identified. Data stored in the slower memory associated with the identified stored fingerprints is copied into the faster memory. The copied data may be compared to the received data. Various embodiments may be included in a network memory architecture to allow for faster data matching and instruction generation in a central appliance.

24 Claims, 7 Drawing Sheets

U.S. PATENT DOCUMENTS

| | | |
|---|---|---|
| 6,910,106 B2 | 6/2005 | Sechrest et al. |
| 6,978,384 B1 | 12/2005 | Milliken |
| 7,007,044 B1 | 2/2006 | Rafert et al. |
| 7,020,750 B2 | 3/2006 | Thiyagaranjan et al. |
| 7,035,214 B1 | 4/2006 | Seddigh et al. |
| 7,069,342 B1 | 6/2006 | Biederman |
| 7,113,962 B1 | 9/2006 | Kee et al. |
| 7,120,666 B2 | 10/2006 | McCanne et al. |
| 7,145,889 B1 | 12/2006 | Zhang et al. |
| 7,200,847 B2 | 4/2007 | Straube et al. |
| 7,215,667 B1 | 5/2007 | Davis |
| 7,242,681 B1 | 7/2007 | Van Bokkelen et al. |
| 7,243,094 B2 | 7/2007 | Tabellion et al. |
| 7,266,645 B2 | 9/2007 | Garg et al. |
| 7,318,100 B2 | 1/2008 | Demmer et al. |
| 7,366,829 B1 * | 4/2008 | Luttrell et al. ............... 711/108 |
| 7,380,006 B2 | 5/2008 | Srinivas et al. |
| 7,383,329 B2 | 6/2008 | Erickson |
| 7,383,348 B2 | 6/2008 | Seki et al. |
| 7,388,844 B1 | 6/2008 | Brown et al. |
| 7,389,357 B2 | 6/2008 | Duffie et al. |
| 7,389,393 B1 | 6/2008 | Karr et al. |
| 7,417,991 B1 | 8/2008 | Crawford et al. |
| 7,420,992 B1 | 9/2008 | Fang et al. |
| 7,451,237 B2 | 11/2008 | Takekawa et al. |
| 7,453,379 B2 | 11/2008 | Plamondon |
| 7,457,315 B1 | 11/2008 | Smith |
| 7,471,629 B2 | 12/2008 | Melpignano |
| 7,532,134 B2 | 5/2009 | Samuels et al. |
| 7,555,484 B2 | 6/2009 | Kulkarni et al. |
| 7,571,343 B1 | 8/2009 | Xiang et al. |
| 7,619,545 B2 | 11/2009 | Samuels et al. |
| 7,620,870 B2 | 11/2009 | Srinivasan et al. |
| 7,639,700 B1 | 12/2009 | Nabhan et al. |
| 7,676,554 B1 | 3/2010 | Malmskog et al. |
| 7,714,747 B2 | 5/2010 | Fallon |
| 7,746,781 B1 | 6/2010 | Xiang |
| 2001/0054084 A1 | 12/2001 | Kosmynin |
| 2002/0007413 A1 | 1/2002 | Garcia-Luna-Aceves et al. |
| 2002/0040475 A1 | 4/2002 | Yap et al. |
| 2002/0078242 A1 | 6/2002 | Viswanath |
| 2002/0101822 A1 | 8/2002 | Ayyagari et al. |
| 2002/0107988 A1 | 8/2002 | Jordan |
| 2002/0116424 A1 | 8/2002 | Radermacher et al. |
| 2002/0131434 A1 | 9/2002 | Vukovic et al. |
| 2002/0163911 A1 | 11/2002 | Wee et al. |
| 2002/0169818 A1 | 11/2002 | Stewart et al. |
| 2002/0181494 A1 | 12/2002 | Rhee |
| 2002/0188871 A1 | 12/2002 | Noehring et al. |
| 2002/0194324 A1 | 12/2002 | Guha |
| 2003/0009558 A1 | 1/2003 | Ben-Yehezkel |
| 2003/0123481 A1 | 7/2003 | Neale et al. |
| 2003/0142658 A1 | 7/2003 | Ofuji et al. |
| 2003/0149661 A1 * | 8/2003 | Mitchell et al. ............... 705/39 |
| 2003/0233431 A1 | 12/2003 | Reddy et al. |
| 2004/0008711 A1 | 1/2004 | Lahti et al. |
| 2004/0047308 A1 | 3/2004 | Kavanagh et al. |
| 2004/0083299 A1 | 4/2004 | Dietz et al. |
| 2004/0114569 A1 | 6/2004 | Naden et al. |
| 2004/0117571 A1 | 6/2004 | Chang et al. |
| 2004/0123139 A1 | 6/2004 | Aiello et al. |
| 2004/0199771 A1 | 10/2004 | Morten et al. |
| 2004/0202110 A1 | 10/2004 | Kim |
| 2004/0203820 A1 | 10/2004 | Billhartz |
| 2004/0205332 A1 | 10/2004 | Bouchard et al. |
| 2004/0243571 A1 | 12/2004 | Judd |
| 2004/0255048 A1 | 12/2004 | Lev Ran et al. |
| 2005/0010653 A1 | 1/2005 | McCanne |
| 2005/0044270 A1 | 2/2005 | Grove et al. |
| 2005/0053094 A1 | 3/2005 | Cain et al. |
| 2005/0091234 A1 | 4/2005 | Hsu et al. |
| 2005/0111460 A1 | 5/2005 | Sahita |
| 2005/0131939 A1 | 6/2005 | Douglis et al. |
| 2005/0132252 A1 | 6/2005 | Fifer et al. |
| 2005/0141425 A1 | 6/2005 | Foulds |
| 2005/0171937 A1 | 8/2005 | Hughes et al. |
| 2005/0177603 A1 | 8/2005 | Shavit |
| 2005/0190694 A1 | 9/2005 | Ben-Nun et al. |
| 2005/0210151 A1 | 9/2005 | Abdo et al. |
| 2005/0220019 A1 | 10/2005 | Melpignano |
| 2005/0235119 A1 | 10/2005 | Sechrest et al. |
| 2005/0256972 A1 | 11/2005 | Cochran et al. |
| 2005/0278459 A1 | 12/2005 | Boucher et al. |
| 2005/0286526 A1 | 12/2005 | Sood et al. |
| 2006/0013210 A1 | 1/2006 | Bordogna et al. |
| 2006/0031936 A1 | 2/2006 | Nelson et al. |
| 2006/0036901 A1 | 2/2006 | Yang et al. |
| 2006/0039354 A1 | 2/2006 | Rao et al. |
| 2006/0059171 A1 | 3/2006 | Borthakur et al. |
| 2006/0059173 A1 | 3/2006 | Hirsch et al. |
| 2006/0117385 A1 | 6/2006 | Mester et al. |
| 2006/0143497 A1 | 6/2006 | Zohar et al. |
| 2006/0195547 A1 | 8/2006 | Sundarrajan et al. |
| 2006/0195840 A1 | 8/2006 | Sundarrajan et al. |
| 2006/0212426 A1 | 9/2006 | Shakara et al. |
| 2006/0218390 A1 | 9/2006 | Loughran et al. |
| 2006/0227717 A1 | 10/2006 | van den Berg et al. |
| 2006/0250965 A1 | 11/2006 | Irwin |
| 2006/0280205 A1 | 12/2006 | Cho |
| 2007/0002804 A1 | 1/2007 | Xiong et al. |
| 2007/0011424 A1 | 1/2007 | Sharma et al. |
| 2007/0110046 A1 | 5/2007 | Farrell et al. |
| 2007/0115812 A1 | 5/2007 | Hughes |
| 2007/0127372 A1 | 6/2007 | Khan et al. |
| 2007/0140129 A1 | 6/2007 | Bauer et al. |
| 2007/0174428 A1 | 7/2007 | Lev Ran et al. |
| 2007/0195702 A1 | 8/2007 | Yuen et al. |
| 2007/0198523 A1 | 8/2007 | Hayim |
| 2007/0226320 A1 | 9/2007 | Hager et al. |
| 2007/0244987 A1 | 10/2007 | Pedersen et al. |
| 2007/0245079 A1 | 10/2007 | Bhattacharjee et al. |
| 2007/0258468 A1 | 11/2007 | Bennett |
| 2007/0263554 A1 | 11/2007 | Finn |
| 2007/0276983 A1 | 11/2007 | Zohar et al. |
| 2008/0005156 A1 | 1/2008 | Edwards et al. |
| 2008/0013532 A1 | 1/2008 | Garner et al. |
| 2008/0133536 A1 | 6/2008 | Bjorner et al. |
| 2008/0184081 A1 | 7/2008 | Hama et al. |
| 2008/0229137 A1 | 9/2008 | Samuels et al. |
| 2008/0243992 A1 | 10/2008 | Jardetzky et al. |
| 2008/0313318 A1 | 12/2008 | Vermeulen et al. |
| 2008/0320151 A1 | 12/2008 | McCanne et al. |
| 2009/0060198 A1 | 3/2009 | Little |
| 2009/0100483 A1 | 4/2009 | McDowell |
| 2009/0158417 A1 | 6/2009 | Khanna et al. |
| 2009/0175172 A1 | 7/2009 | Prytz et al. |
| 2009/0234966 A1 | 9/2009 | Samuels et al. |
| 2010/0011125 A1 | 1/2010 | Yang et al. |
| 2010/0115137 A1 | 5/2010 | Kim et al. |
| 2010/0290364 A1 | 11/2010 | Black |

OTHER PUBLICATIONS

"A protocol-independent technique for eliminating redundant network traffic—, ACM SIGCOMM Computer CommunicationReview, vol. 30, Issue 4 (Oct. 2000) pp. 87-95, Year of Publication: 2000".

"B. Hong, D. Plantenberg, D. D. E. Long, and M. Sivan-Zimet." "Duplicate data elimination in a SAN file system", InProceedings of the 21st Symposium on Mass Storage Systems (MSS '04), Goddard, MD, Apr. 2004. IEEE.

"You, L. L. And Karamanolis, C. 2004. '"Evaluation of efficient archival storage techniques"', In Proceedings of the 21 st IEEESymposium on Mass Storage Systems and Technologies (MSST).".

"Fred Douglis and Arun Iyengar, Application specific Delta-encoding via Resemblance Detection", Published in the 2003 USENIX Annual Technical Conference.

You L. L. et al., "Deep Store an Archival Storage System Architecture" Data Engineering, 2005. ICDE 2005. Proceedings. 21st.inti Conf on Tokyo, Japan, Apr. 5-8, 2005, p. 12.

"Udi Manber. "Finding Similar Files in a Large File System", TR 93-33 Oct. 1994, Department of Computer Science,University of Arizona. http://webglimpse.net/pubs/TR93-33.pdf. Also appears in the 1994 winter USENIX Technical Conference." .

* cited by examiner

PRE-FETCHING DATA INTO A MEMORY

CROSS-REFERENCES

This nonprovisional U.S. patent application is related to U.S. patent application Ser. No. 11/825,440 filed Jul. 5, 2007 and entitled, "Identification of Data Stored in Memory" which is hereby incorporated herein by reference.

BACKGROUND OF THE INVENTION

1. Field of the Invention

The present invention relates generally to copying stored data into a memory and more specifically to pre-fetching data into the memory.

2. Description of the Related Art

Electronic data is stored in a digital device such as a computer, server, network appliance, or the like. The digital device typically comprises two or more memories in which the data is stored. These memories may include faster memory such as random access memory (e.g., RAM), and slower memory such as a disk (e.g., hard disk). Typically, the digital device has much more slower memory than faster memory. Further, the faster memory is typically more volatile than the slower memory.

In the digital device, a request for data is received. The digital device then retrieves the data from either the slower memory or the faster memory. The digital device typically processes the data that is retrieved. The time for data retrieval depends on whether the data is stored in the faster memory or in the slower memory. Typically, the greatest delay in data retrieval is caused by retrieving the data from the slower memory.

When multiple data requests are received in succession, a queue of data packets may be formed. The length of the queue is largely dependent on the number of retrieves from the slower memory that are required and the amount of processing of each packet after the data is retrieved from the slower memory or the faster memory. Typically, retrieval from the slower memory requires more time than the processing of a packet. To reduce the amount of time required to execute a request for data, a system and method for reducing the number of retrieves from the slower memory is needed.

SUMMARY OF THE INVENTION

In exemplary embodiments, a method comprises copying stored data into a faster memory. Data is received and pre-scanned to generate a sample fingerprint. Fingerprints stored in a faster memory that are similar to the sample fingerprint are identified. Data stored in the slower memory associated with the stored fingerprints is copied into the faster memory.

In various embodiments, a prioritization algorithm may be used to retrieve the stored data associated with the identified stored fingerprints. Further, it may be determined whether the received data represented by the sample fingerprint is similar to positioned data in the faster memory. A slip search may be used to compare the received data to the copied data. It may also be determined whether the received data represented by the sample fingerprint is in the slower memory of the second digital device and transmitting at least a portion of the received data to the second digital device.

The faster memory may comprise random access memory and a slower memory may comprise a hard disk. The faster memory may be associated with a network memory appliance. The fingerprint may comprise a hash value. Further, the stored data may correspond to other stored data in a slower memory in a second digital device.

In other exemplary embodiments, a system for copying stored data into a faster memory may comprise a scan module, a search module, and a duplication module. The scan module is configured to pre-scan received data to generate a sample fingerprint. The search module is configured to identify stored fingerprints similar to the sample fingerprint. The duplication module is configured to copy stored data associated with the identified stored fingerprints into a faster memory.

In various embodiments, a computer readable medium may have embodied thereon a program, the program being executable by a processor for performing a method for copying stored data into a faster memory is disclosed. The method may comprise receiving data, pre-scanning the received data to generate a sample fingerprint, identifying stored fingerprints similar to the sample fingerprint, and copying stored data associated with the identified stored fingerprint into a faster memory.

DETAILED DESCRIPTION OF THE INVENTION

In one example, prior to data processing, desired data is first identified and then may be located. The desired data may be stored in a computer system's slower memory (e.g., hard drive) or faster memory (e.g., RAM). If the desired data is within the faster memory, the desired data may be retrieved by the processor when needed with limited delay. However, when desired data is stored in the slower memory, there may be a significant delay while the desired data is retrieved. This delay may cause poor performance as processing may stall. This delay is compounded when taking into account that other processes, some that also depend on data within the slower memory, may also be stalled as the processor awaits the retrieval of the desired data.

In various embodiments, desired data can be identified and located in faster or slower memory prior to the moment of processing. In one example, the operation that requires the desired data may be within a queue (e.g., buffer). The desired data may be identified at the time the desired data is placed in the queue rather than at the moment of processing. Once the desired data is identified and located, the desired data may be retrieved from the slower memory and placed into the faster memory prior to the moment of processing. As a result, delay caused by retrieval of data from the slower memory and processor stall may be avoided.

Figure 1:
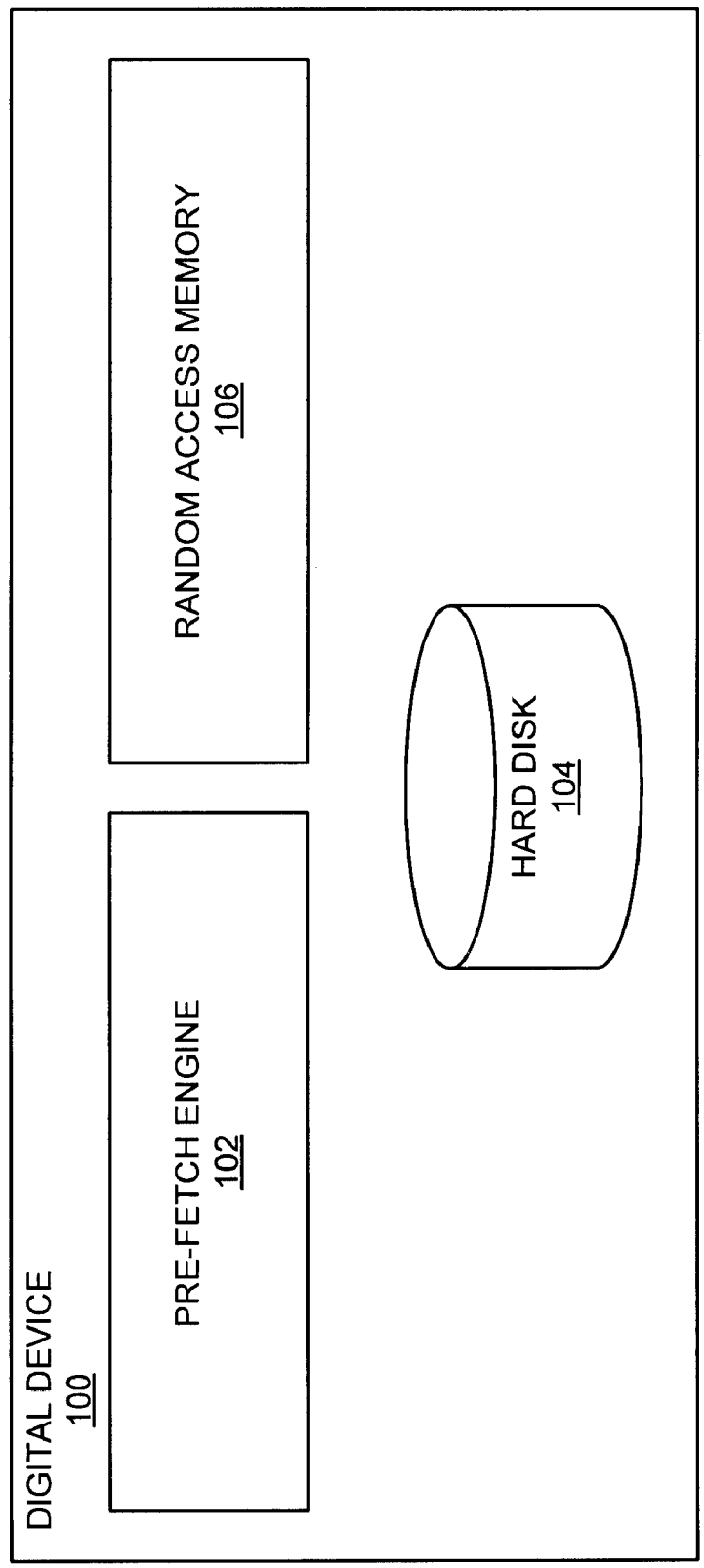
FIG. 1 is a block diagram of an exemplary digital device according to various embodiments.

FIG. 1 is a block diagram of an exemplary digital device 100 according to various embodiments. The digital device 100 comprises a pre-fetch engine 102, a hard disk 104, and a random access memory (RAM) 106. The pre-fetch engine 102 is configured to access the hard disk 104 and the RAM 106 and determine whether data is stored in the hard disk 104 or the RAM 106. If the data is stored in the hard disk 104, the pre-fetch engine 102 generates a command to copy the data into the RAM 106. In some embodiments, the pre-fetch engine 102 may prioritize retrieval of data stored on the hard disk 104 according to a frequency measure or other algorithm.

The digital device 100 comprises at least two memories. The hard disk 104 is one example of a slower memory that may be included in the digital device 100. Other examples of a slower memory include read-only memory (ROM), FLASH memory, or the like.

The RAM 106 is one example of a faster memory that may be included in the digital device 100. Other examples of a faster memory include FLASH memory, or the like. Based on the amount of time required to pre-fetch the data and/or the size of the RAM, the RAM 106 may store data according to a least recently used (LRU) algorithm, a first-in, first-out (FIFO) algorithm, or the like.

Figure 2:
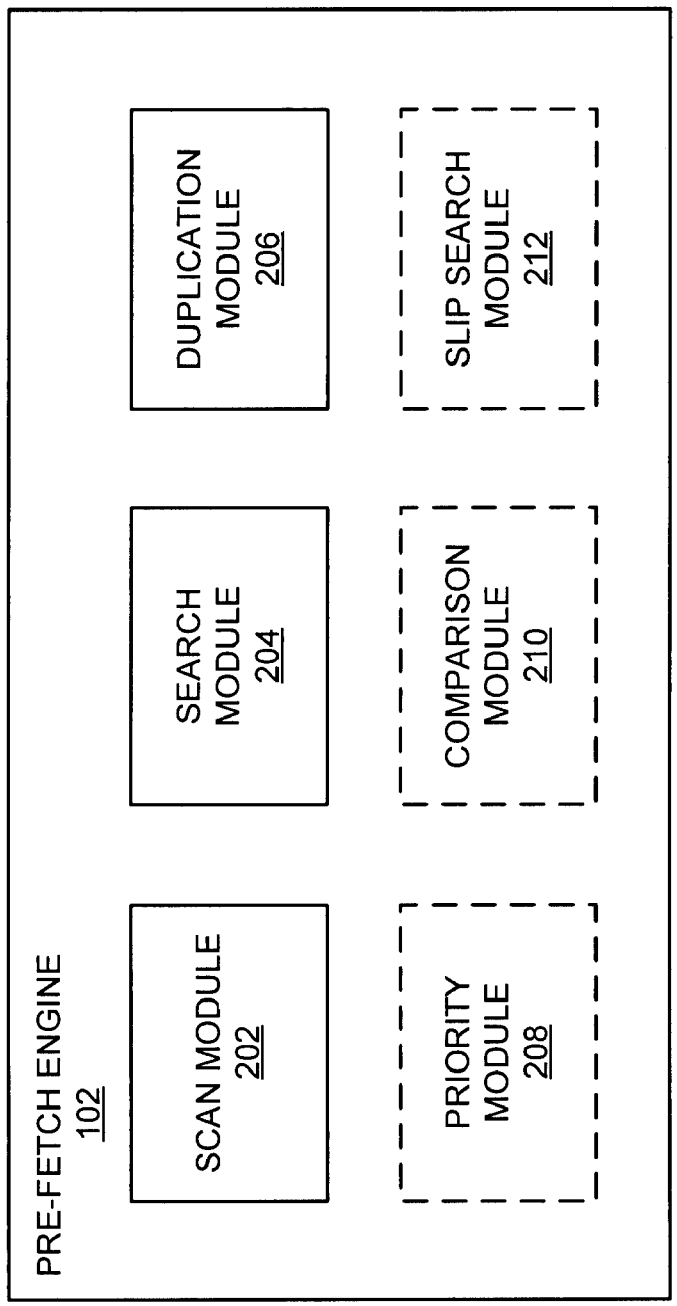
FIG. 2 is a block diagram of an exemplary pre-fetch engine according to various embodiments.

FIG. 2 is a block diagram of an exemplary pre-fetch engine 102 according to various embodiments. The pre-fetch engine 102 is configured to receive a data packet indicating stored data in the hard disk 104 and copy the stored data from the hard disk 104 to the RAM 106. The pre-fetch engine 102 comprises a scan module 202, a search module 204, and a duplication module 206. Optionally, the pre-fetch engine 102 may additionally comprise a priority module 208, a comparison module 210, and/or a slip search module 212. In various embodiments, the modules included in the pre-fetch engine 102 may be embodied in firmware, hardware, and/or software (stored on a computer readable media) executable by a processor.

The scan module 202 is configured to generate a sample fingerprint from received data. The sample fingerprint may comprise one or more hash values calculated according to a checksum and/or cyclical redundancy check (CRC) as is known to those skilled in the art. In some embodiments, a sample fingerprint of a contiguous or non-contiguous portion of the received data is generated. Other methods for generating the sample fingerprint apparent to those skilled in the art may also be used.

The search module 204 is configured to determine whether a stored fingerprint is identical to the sample fingerprint. The stored fingerprint corresponds to data stored in the hard disk 104. Thus, if a stored fingerprint identical to the sample fingerprint exists, data corresponding to the received data may be retrieved from the hard disk 104. In one example, the stored fingerprint is stored in RAM 106. Although a stored fingerprint (corresponding to data stored within the hard disk 104) may be stored in RAM 106, the data itself may still be stored within the hard disk 104. Further, in some embodiments, the stored fingerprint corresponds to a contiguous or non-contiguous portion of data stored in the hard disk 104.

The duplication module 206 is configured to copy the data corresponding to the stored fingerprint in the hard disk 104 to the RAM 106. The data corresponding to the stored fingerprint may be similar or identical to the received data. Once the data is stored in the RAM 106, it can be retrieved faster than data stored on the hard disk 104.

The optional priority module 208 is configured to prioritize the received data for retrieval from the hard disk 104. The priority module 208 may prioritize the pre-fetches when the number of pre-fetches requested exceeds a number of pre-fetches that can be performed. The priority module 208 may prioritize the pre-fetches by determining which pre-fetched data will be most useful during later processing. The priority module 208 may rank the received data based on a statistical algorithm, heuristic, or the like. For example, received data that has been retrieved recently may have a lower priority because it is likely to be in the RAM 106. Received data that has been modified recently may have a higher priority, for example. In some embodiments, for example, the hard disk 104 may be divided into blocks and a requested frequency may be recorded corresponding to how often the block has been recently requested. A block which has been requested more often (e.g., a higher requested frequency) may be assigned a higher priority.

The optional comparison module 210 is configured to compare the data retrieved from the hard disk 104 to the received data. More specifically, the comparison module 210 is configured to determine whether the received data represented by the sample fingerprint is similar to positioned data in a faster memory.

The optional slip search module 212 is configured to perform a "slip search" to generate a retrieval command in embodiments where the digital device 100 is configured to communicate over a network. These embodiments are described herein, for example, in connection with FIGS. 5-7.

The slip search module 212 may determine if the data within the faster memory (e.g., the data retrieved from the slower memory and placed in faster memory) is similar to the received data (via slip searching). If the data is similar, albeit with deletions, additions, or modifications, the slip search module 212 (or another module) may generate instructions to correct the deletions, additions, or modifications (e.g., "patch" the received data). In various embodiments, it is faster to identify similar data within a digital device 100 across a network and patch the data as needed rather than transmitting data in its entirety to the digital device.

In one example of slip searching, the slip search module 212 compares a packet byte within a data packet of the received data to memory data within the faster memory. If the two bytes are identical, the slip search module 212 can compare the next two bytes sequentially and so forth until a sufficient match is identified. If the two bytes are not identical, the slip search module 212 may jump forward or backward to another memory location within the data packet and the memory to compare another two bytes. If the two bytes are identical, the next two bytes may be compared. The process can continue until a sufficient match is discovered or a determination is made that the data packet and the data within memory are too dissimilar. Slip searches are described in greater detail in U.S. patent application Ser. No. 11/825,440 filed Jul. 5, 2007 and entitled, "Identification of Data Stored in Memory" which is hereby incorporated herein by reference.

Figure 3:
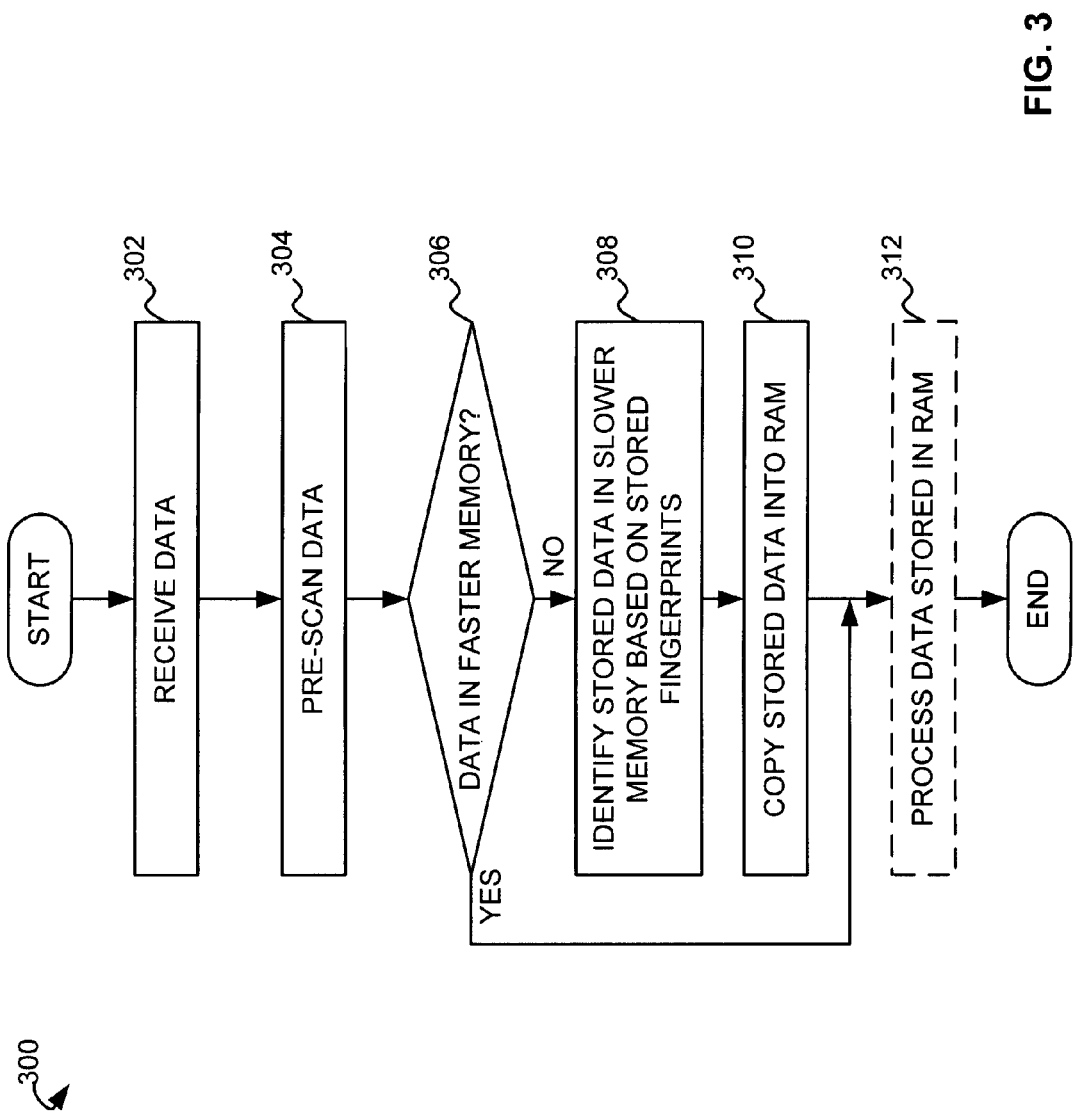
FIG. 3 is a flow chart of an exemplary method for pre-fetching data into a memory according to various embodiments.

FIG. 3 is a flow chart of an exemplary method 300 for pre-fetching data into a memory according to various embodiments. The method 300 may be performed by the pre-fetch engine 102 according to some embodiments. The method 300 allows received data to be pre-fetched from the hard disk 104 into the RAM 106. By pre-fetching data into the RAM 106, the amount of time required to access and/or process the received data may be reduced.

In step 302, the data is received at the pre-fetch engine 102. The received data may comprise data packets, a data stream, or the like. In some embodiments, the data is enqueued for future processing. The method 300 may run parallel to the processing of the data in the queue to increase the likelihood that the data is in the RAM 106 at step 312.

In step 304, the data may be pre-scanned by the scan module 202 to generate a sample fingerprint of the received data. The sample fingerprint may comprise one or more hash values.

In step 306, a determination is made as to whether the received data is in a faster memory, such as the RAM 106. The determination may be made by comparing the sample fingerprint to one or more stored fingerprints of data that is likely to be in RAM 106. The data is likely to be in RAM 106, for example, if the data has been recently accessed.

In step 308, if the data is not in the RAM 106, stored data in the hard disk 104 may be identified based on the stored fingerprints. The determination is based on a comparison between the sample fingerprint and a plurality of stored fingerprints. Each of the stored fingerprints may correspond to different data stored in the hard disk 104. In some embodiments, the stored data is identified if the stored fingerprint is identical to the sample fingerprint.

In step 310, the identified stored data is copied from the hard disk 104 to the RAM 106. The identified stored data may be an exact duplicate or similar to the received data. The identified stored data may be copied into the RAM 106 according to an LRU or FIFO algorithm. According to some embodiments, a determination may be made as to whether to copy the identified stored data according to a prioritization algorithm. For example, the identified stored data may not be copied if it is likely to already be in the RAM 106 and/or if a determination is made to not evict any of the data in the RAM 106. Alternately, if the hard disk 104 is busy, the identified stored data may not be pre-fetched.

In optional step 312, the copied data stored in the RAM 106 is processed. In some embodiments, for example, the copied data may be compared to the received data. According to various embodiments, a retrieval instruction may be sent to another digital device as will be discussed in connection with FIGS. 5-7. In some embodiments, if the data is not in the RAM 106, the processing may pause until the data is retrieved from the hard disk 104, the received data may be dropped from the queue, or the data packet may be sent to another digital device without performing the comparison.

Although FIGS. 3-5 and 7 discuss slower memory (e.g., hard disk 104) and faster memory (e.g., RAM 106), it will be appreciated by those skilled in the art that any slower memory, not necessarily limited to the hard disk 104, and any faster memory, not necessarily limited to the RAM 106, may be used.

Figure 4:
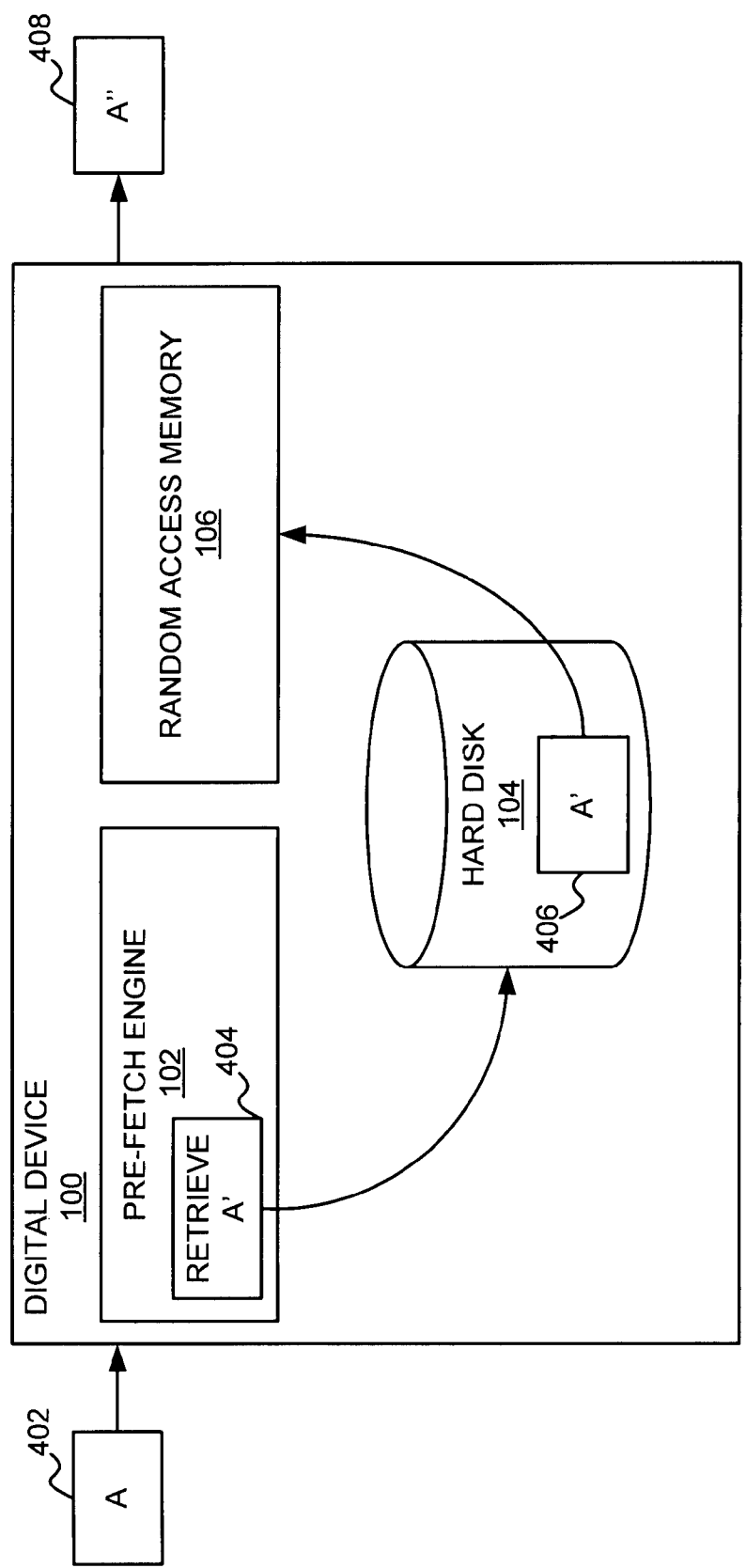
FIG. 4 is a flow diagram of data through the exemplary digital device according to various embodiments.

FIG. 4 is a flow diagram of data through the exemplary digital device 100 according to various embodiments. The data is pre-fetched from the hard disk 104 to the RAM 106. For example, Data A 402 is received at the digital device 100. Data A 402 may comprise a data stream, a data packet, or the like. The pre-fetch engine 102 processes the Data A 402 to determine whether to generate a retrieve command to retrieve the Data A 402 from the hard disk 104. If a copy of Data A 402, or data similar to Data A 402, is stored in the hard disk 104, the pre-fetch engine 102 executes a retrieve command 404 (i.e., Retrieve A') to retrieve the identified Data A' 406 from the hard disk 104. Data A' 406 may comprise a copy of the Data A 402 or data similar to Data A 402. For example Data A' 406 may comprise a different version of Data A 402. After the Data A' 406 is copied into the RAM 106, the digital device may output Data A" 408. The Data A" 408 may comprise at least a portion of Data A 402 and/or instructions based on a comparison between Data A 402 and Data A' 406.

Figure 5:
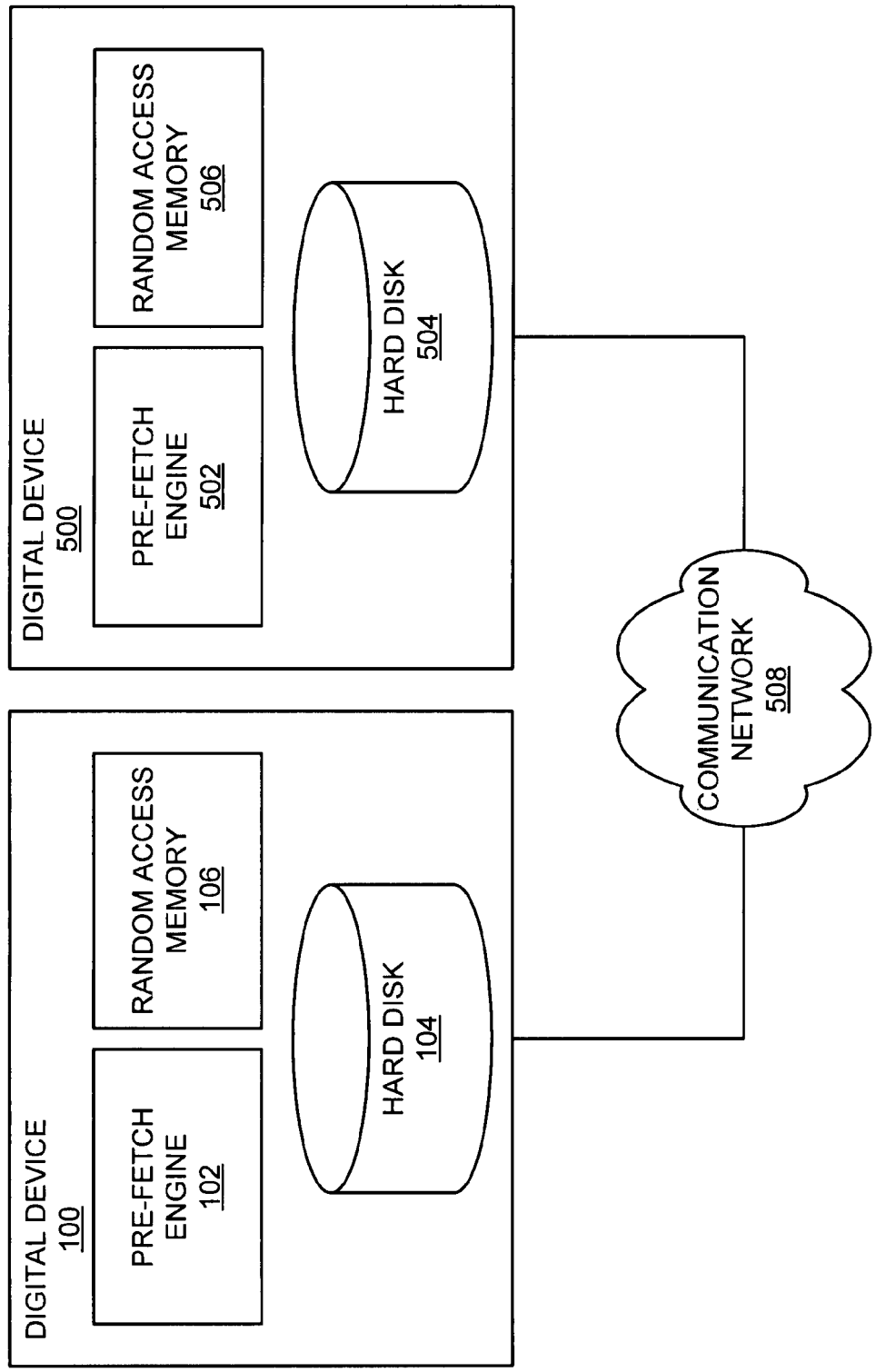
FIG. 5 is a block diagram of two exemplary digital devices configured to electronically communicate data according to various embodiments.

FIG. 5 is a block diagram of two exemplary digital devices 100 and 500 configured to electronically communicate data according to various embodiments. Digital device 100 is configured to communicate data over a communication network 508 to another digital device 500. In the embodiment shown, the digital device 500 is substantially similar to the digital device 100 and comprises a pre-fetch engine 502, a hard disk 504, and a random access memory 506. The communication network 508 may comprise a public and/or a private network. In some embodiments, the communication network 508 may be a local area network (LAN), a wide area network (WAN), and/or the Internet. According to various embodiments; the hard disk 504 and/or the RAM 506 may be replaced with another type of slower memory and/or faster memory, respectively.

In some embodiments, the hard disk 104 and/or the RAM 106 in the digital device 100 may comprise generated data corresponding to data stored in the hard disk 504 and/or the RAM 506 in the digital device 500. The generated data may be based on data received from the digital device 500 and/or another digital device (not shown). In some embodiments, the digital device 100 may store the generated data based on communications between the digital device 100 and the digital device 500.

For example, if the digital device 100 receives data from the digital device 500, the digital device 100 may store a copy of the data (or some other record indicating what data was sent) to indicate that the data is stored in the digital device 500. In other instances, if the digital device 100 sends data to the digital device 500, the digital device 100 may store a copy of the data to indicate that the data is stored in the digital device 500 because the digital device has received the data previously.

Figure 6:
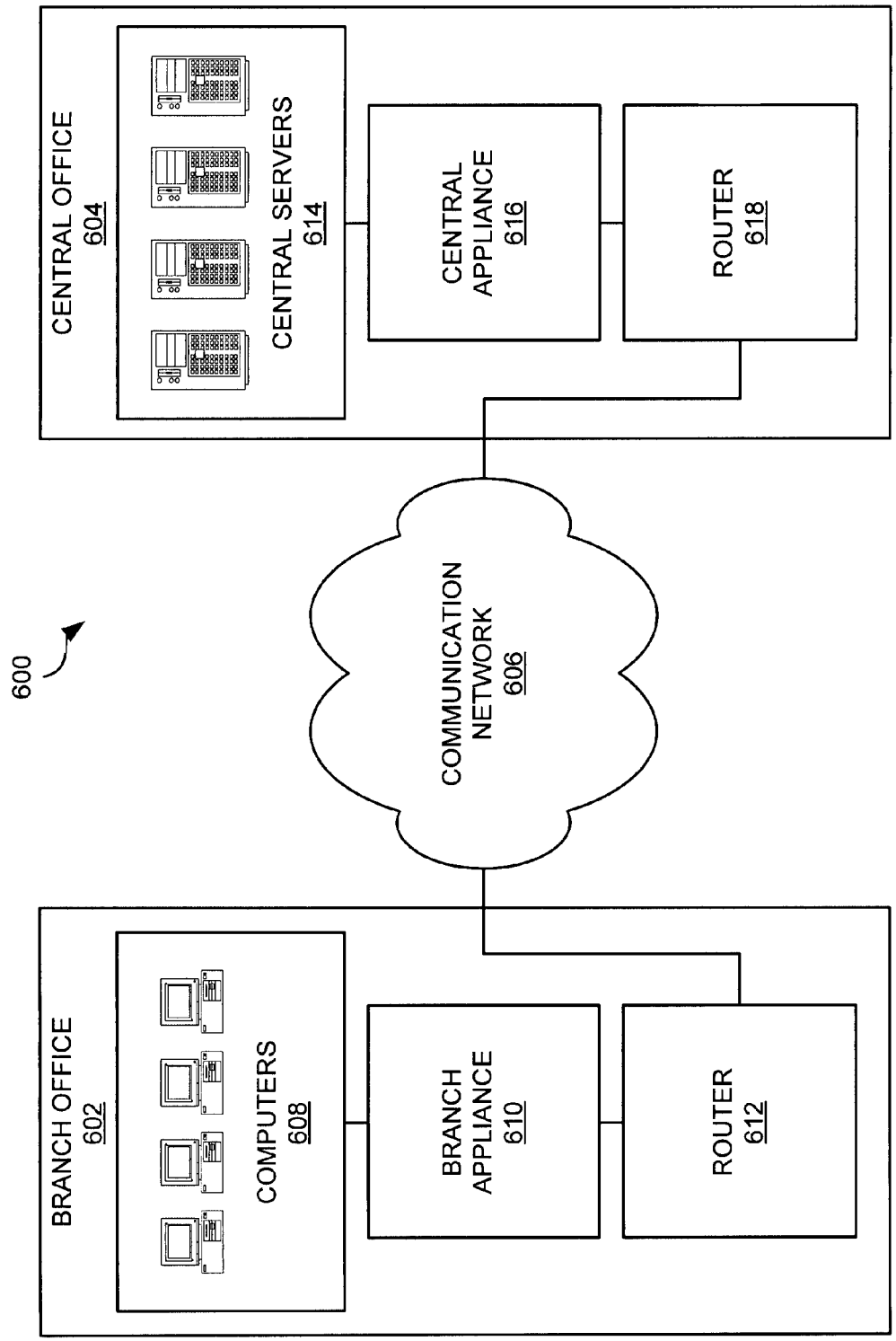
FIG. 6 illustrates an embodiment of a network memory system according to various embodiments.

FIG. 6 illustrates an embodiment of a network memory system 600 according to various embodiments. The network memory system 600 includes a branch office 602, a central office 604, and a communication network 606. The branch office 602 includes computers 608, a branch appliance 610, and a router 612. The branch appliance 610 may be a digital device 100 and/or comprise a pre-fetch engine 102. The central office 604 includes central servers 614, a central appliance 616, and a router 618. The central appliance 610 may be a digital device 100 and/or comprise a pre-fetch engine 102.

In the branch office 602, the computers 608 are linked to the branch appliance 610. The branch appliance 610 is linked to the router 612. The router 612 is coupled to the communication network 606. In the central office 604, the central servers 614 are linked to the central appliance 616. The central appliance 616 is linked to the router 618. The router 618 is coupled to the communication network 606.

For the sake of simplicity, FIG. 6 illustrates the network memory system 600 having a single branch office 602 and a single central office 604, and the respective communication between the branch office 602 and the central office 604. The principles discussed herein are equally applicable to multiple branch offices 602 (not shown) and to multiple central offices 604 (not shown) which are similarly coupled to the communication network 606. Branch office/branch office communication and central office/central office communication, as well as multi-appliance and/or multi-node communication and bi-directional communication are further within the scope of the disclosure.

The communication network 606 comprises hardware and/or software elements that enable the exchange of information (e.g., voice and data) between the branch office 602 and the central office 604. Possible implementations of the communication network 606 include a private wide-area network (WAN), and the Internet. Typical connections from the branch office 602 to the communication network 606 (e.g., from the router 612 and the router 618) may include ISDN, T1 lines (1.544 Mbps), and broadband connections such as digital subscriber lines (DSL) and cable modems. Other examples include T3 lines (43.232 Mbps), OC3 (155 Mbps), and OC48 (2.5 Gbps), although these are more costly and more likely to be used for interconnection at the central office 604 or as the backbone of the communication network 606.

The branch appliance 610 comprises hardware and/or software elements configured to receive data (e.g., email, files, and databases transactions), determine whether a portion of the data is locally accessible to another appliance (e.g., the central appliance 616), generate an instruction based on the determination, and transfer the instruction to the other appliance. The branch appliance 610 also comprises hardware and/or software elements configured to receive an instruction from another appliance (e.g., the central appliance 616), process the instruction to obtain data, and transfer the data to a computer (e.g., the computers 608).

Locally accessible data comprises any data transferable to the computer (e.g., the computers 608 and the central servers 614) by an appliance (e.g., the branch appliance 610 and the central appliance 616) without transferring the data over the communication network 606. In some examples, the locally accessible data is stored in random access memory (RAM) in the branch appliance 610, on a hard drive in the branch appliance 610, or both. In another example, the locally accessible data is accessible by the branch appliance 610 over a local communication network (such as a LAN), for example, in a network attached storage (NAS) device that is internal or external to the branch office 602, and/or in an optical or flash storage device.

The instruction to be received by the branch appliance 610 comprises any message or signal that indicates an action to perform with the data. An instruction may indicate to the branch appliance 610 to store the data, to retrieve the data, or to forward the data to, for example, the computers 608. The instruction may be explicit, or may be implicit and based upon instructions indicating to store or retrieve data. In some embodiments, the instruction may indicate an index within a database for storing and retrieving the data.

The central appliance 616 similarly comprises hardware and/or software elements configured to receive data to be sent to the computer 608, determine whether a portion of the data is locally accessible to the branch appliance 610, generate an instruction based on the determination, and transfer the instruction to the other appliance. The central appliance 616 also comprises hardware and/or software elements configured to receive an instruction from another appliance (e.g., the branch appliance 610), process the instruction to obtain the data, and transfer the data to a computer (e.g., the central servers 614).

As illustrated, the branch appliance 610 is located in-line between the computers 608 and the router 612. The central appliance 616 is also located between the central server 614 and the router 618. The branch appliance 610 and the central appliance 616 transparently intercept network traffic between the computers 608 and the central servers 614. For example, the central appliance 616 transparently intercepts data sent from the central servers 614 and addressed to the computers 608. The computers 608 and the central servers 614 advantageously require no additional configuration because the branch appliance 610 and the central appliance 616 operate transparently.

Alternatively, the branch appliance 610 and the central appliance 616 may be configured as an additional router or gateway. As a router, for example, the branch appliance 610 appears to the computers 608 as an extra hop before the router 612. In some embodiments, the branch appliance 610 and the central appliance 616 provide redundant routing or peer routing with the router 612 and the router 618.

Like the digital device 100, the central appliance 616 accesses a record indicating data sent previously to the branch appliance 610 when generating instructions. For example, the central appliance 616 may locally store data sent to the branch appliance 610. If the data is to be transferred again from the central appliance 616 to the branch appliance 610, the central appliance 616 may determine that the data is locally accessible to the branch appliance 610 and generate an instruction to the branch appliance 610 to retrieve the data from its locally accessible memory. The central appliance 616 sends the instruction to the branch appliance 610 and the branch appliance 610 processes the instruction to obtain the data. Subsequently, if the branch appliance 610 is to transfer the same data to the central appliance 616, the branch appliance 610 may make a determination based on having received the data from the central appliance 616 originally. The branch appliance 610 determines that the data is therefore locally accessible to the central appliance 616 and generates an instruction to the central appliance 616 to retrieve the data and transmits it. The central appliance 616 then processes the instruction to obtain the data. Therefore, an appliance (e.g., the branch appliance 610 and the central appliance 616) in the network memory system 600 advantageously uses data transferred to and from the appliance to reduce network traffic with other appliances in the network memory system 600.

Figure 7:
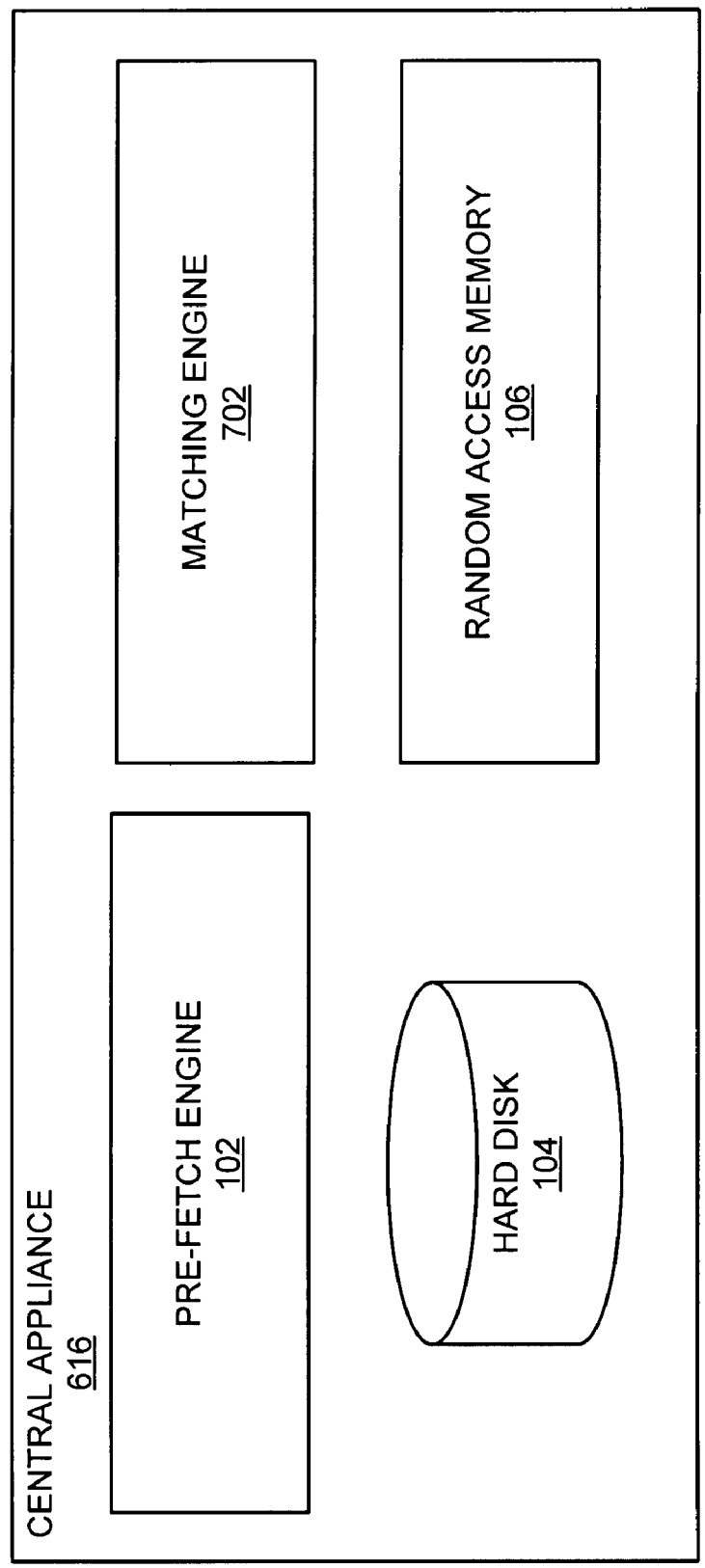
FIG. 7 is a block diagram of an exemplary central appliance according to various embodiments.

FIG. 7 is a block diagram of an exemplary central appliance 616 according to various embodiments. Like the digital device 100, the central appliance 616 comprises a pre-fetch engine 102, a hard disk 104, and a RAM 106. The central appliance further comprises a matching, engine 702.

In embodiments comprising a central appliance 616 and a branch appliance 610, one of the computers 608 may send request to one of the central servers 614 for the Data A 402. The central server will send Data A 402 to the central appliance 616 (which acts a digital device 100). The central appliance 616 will determine whether to send a retrieve instruction for Data A 402 to the branch appliance 610, a portion of the Data A 402, and/or all of Data A 402 based on whether the Data A 402 is already stored in the central appliance 610.

Upon receiving Data A 402, the pre-fetch engine 102 may generate a sample fingerprint of the Data A 402. The pre-fetch engine 102 may compare the sample fingerprint to stored fingerprints in the RAM 106. The stored fingerprints correspond to data, including Data A' 406, stored in the hard disk 104. If at least one of the stored fingerprints is identical to the sample fingerprint, a retrieve instruction for the stored data corresponding to the identical stored fingerprint is generated. In some embodiments, the central appliance 616 may send the retrieve instruction, Retrieve A' 404, to the branch appliance 610. When the retrieve instruction, Retrieve A' 404, is executed, a copy of the Data A' 406 is stored in the RAM 106.

The stored Data A' 406 may be similar, but not identical to, the received Data A 402. Thus, to maintain data integrity, Data A' 406 is bitwise compared to Data A 402. The matching engine 702 is configured to match the Data A' 406 retrieved from the hard disk 104 to the received Data A 402. The matching engine is also configured to generate and send a retrieve instruction to the branch appliance 610. The matching engine 702 may also send at least a portion of the received Data A 402 based on the comparison. The matching engine 702 may comprise, for example, the comparison module 210 and/or the slip search module 212 as discussed herein in connection with, at least, FIG. 2. The matching engine 702 may generate a patch instruction comprising additions, insertions, and/or deletions to modify Data A' 406 to generate Data A 402.

The above-described functions can be comprised of executable instructions that are stored on storage media. The executable instructions can be retrieved and executed by a processor. Some examples of executable instructions are software, program code, and firmware. Some examples of storage media are memory devices, tape, disks, integrated circuits, and servers. The executable instructions are operational when executed by the processor to direct the processor to operate in accord with the invention. Those skilled in the art are familiar with executable instructions, processor(s), and storage media.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for copying stored data into a faster memory, the method comprising:
   receiving data;
   pre-scanning the received data to generate a sample fingerprint;
   identifying stored fingerprints similar to the sample fingerprint;
   copying stored data associated with the identified stored fingerprints into a faster memory;
   comparing first data bytes in the received data with first memory bytes within the faster memory;
   determining a mismatch between one of the first data bytes and one of the first memory bytes;
   jumping a number of bytes in the faster memory to second memory bytes that are non-consecutive with the first memory bytes;
   jumping a number of bytes in the data to second data bytes that are non-consecutive with the first data bytes;
   comparing the second data bytes to the second memory bytes; and
   generating a patch instruction based on the comparisons.

2. The method of claim 1, further comprising retrieving the stored data associated with the identified stored fingerprints according to a prioritization algorithm.

3. The method of claim 1, wherein the faster memory comprises random access memory and a slower memory comprises a hard disk.

4. The method of claim 1, further comprising determining whether the received data represented by the sample fingerprint is similar to positioned data in the faster memory.

5. The method of claim 1, wherein the faster memory is associated with a network memory appliance.

6. The method of claim 1, wherein the fingerprint comprises a hash value.

7. The method of claim 1, wherein the stored data corresponds to other stored data in a slower memory in a second digital device.

8. The method of claim 7, further comprising:
   determining whether the received data represented by the sample fingerprint is in the slower memory of the second digital device; and
   transmitting at least a portion of the received data to the second digital device.

9. A system for copying stored data into a faster memory, the system comprising:
   a scan module configured to pre-scan received data to generate a sample fingerprint;
   a search module configured to identify stored fingerprints similar to the sample fingerprint;
   a duplication module configured to copy stored data associated with the identified stored fingerprints into a faster memory; and
   a slip search module configured to compare a first data byte in the received data with a first memory byte within the faster memory, determine a mismatch between the first data byte and the first memory byte, jump to a memory location containing a second memory byte that is non-consecutive with the first memory byte, jump to a packet location containing a second data byte that is non-consecutive with the first data byte, compare the second data byte to the second memory byte, and generate a patch instruction based at least in part on a result of the comparison between the second packet byte and the second memory byte.

10. The system of claim 9, further comprising a priority module configured to retrieve the stored data associated with the identified stored fingerprints according to a prioritization algorithm.

11. The system of claim 9, wherein the faster memory comprises random access memory and a slower memory comprises a hard disk.

12. The system of claim 9, further comprising a comparison module configured to determine whether the received data represented by the sample fingerprint is similar to positioned data in a faster memory.

13. The system of claim 9, wherein the faster memory is associated with a network memory appliance.

14. The system of claim 9, wherein the fingerprint comprises a hash value.

15. The system of claim 9, wherein the stored data corresponds to other stored data in a slower memory in a second digital device.

16. The system of claim 15, wherein the comparison module is configured to determine whether the received data represented by the sample fingerprint is in the slower memory and transmit at least a portion of the received data to the second digital device.

17. A computer readable medium having embodied thereon a program, the program being executable by a processor for performing a method for copying stored data into a faster memory, the method comprising:
   receiving data;
   pre-scanning the received data to generate a sample fingerprint;
   identifying stored fingerprints similar to the sample fingerprint; copying stored data associated with the identified stored fingerprint into a faster memory;
   comparing first data bytes in the received data with first memory bytes within the faster memory;
   determining a mismatch between one of the first data bytes and one of the first memory bytes;
   jumping a number of bytes in the faster memory to second memory bytes that are non-consecutive with the first memory bytes;
   jumping a number of bytes in the data to second data bytes that are non-consecutive with the first data bytes;
   comparing the second data bytes to the second memory bytes; and
   generating a patch instruction based on the comparisons.

18. The computer readable medium of claim 17, wherein the method further comprises retrieving the stored data associated with the identified stored fingerprints according to a prioritization algorithm.

19. The computer readable medium of claim 17, wherein the faster memory comprises random access memory and a slower memory comprises a hard disk.

20. The computer readable medium of claim 17, wherein the method further comprises determining whether the received data represented by the sample fingerprint is similar to positioned data in the faster memory.

21. The computer readable medium of claim 17, wherein the faster memory is associated with a network memory appliance.

22. The computer readable medium of claim 17, wherein the fingerprint comprises a hash value.

23. The computer readable medium of claim 17, wherein the stored data corresponds to other stored data in a slower memory in a second digital device.

24. The computer readable medium of claim 23, wherein the method further comprises:
   determining whether the received data represented by the sample fingerprint is in the slower memory; and
   transmitting at least a portion of the received data to the second digital device.

* * * * *

UNITED STATES PATENT AND TRADEMARK OFFICE
CERTIFICATE OF CORRECTION

| | | |
|---|---|---|
| PATENT NO. | : 8,095,774 B1 | Page 1 of 1 |
| APPLICATION NO. | : 11/825497 | |
| DATED | : January 10, 2012 | |
| INVENTOR(S) | : David Hughes et al. | |

It is certified that error appears in the above-identified patent and that said Letters Patent is hereby corrected as shown below:

At column 6, line 42, please delete the number "610" and replace it with the number "616".

At column 8, line 37, please delete the word "send" and replace it with "send a".

At column 8, line 44, please delete the number "610" and replace it with the number "616".

At column 9, lines 4-5, please delete the words "Data A 402" and replace them with "Data A" 408".

At column 10, line 54, please make a line break after "identifying stored fingerprints similar to the sample fingerprint;" and please put "copying stored data associated with the identified stored fingerprint into a faster memory;" on the new line.

Signed and Sealed this
Fourteenth Day of August, 2012

David J. Kappos
*Director of the United States Patent and Trademark Office*